(12) United States Patent
Totemeier et al.

(10) Patent No.: US 11,195,629 B2
(45) Date of Patent: Dec. 7, 2021

(54) FUEL ASSEMBLY

(71) Applicant: Lightbridge Corporation, McLean, VA (US)

(72) Inventors: Aaron Totemeier, Washington, DC (US); Sergey M. Bashkirtsev, Moscow (RU); Alexey G. Morozov, Moscow (RU)

(73) Assignee: THORIUM POWER, INC., McLean, VA (US)

( * ) Notice: Subject to any disclaimer, the term of this patent is extended or adjusted under 35 U.S.C. 154(b) by 122 days.

(21) Appl. No.: 16/241,512

(22) Filed: Jan. 7, 2019

(65) Prior Publication Data

US 2020/0027576 A1  Jan. 23, 2020

Related U.S. Application Data

(63) Continuation of application No. 14/856,084, filed on Sep. 16, 2015, now Pat. No. 10,192,644, which is a
(Continued)

(51) Int. Cl.
*G21C 3/328* (2006.01)
*G21C 3/322* (2006.01)
(Continued)

(52) U.S. Cl.
CPC ............. *G21C 3/328* (2013.01); *G21C 3/322* (2013.01); *G21C 1/20* (2013.01); *G21C 3/08* (2013.01);
(Continued)

(58) Field of Classification Search
CPC .......... G21C 3/08; G21C 3/322; G21C 3/326; G21C 3/328; G21C 3/338; G21C 1/20; G21C 21/10
(Continued)

(56) References Cited

U.S. PATENT DOCUMENTS 2,780,517 A   2/1957  Fontana
2,879,216 A   3/1959  Horwitz
(Continued)

FOREIGN PATENT DOCUMENTS

CN   86108810 A   8/1987
CN   1192820 A    9/1998
(Continued)

OTHER PUBLICATIONS

Bol'sakov et al., "Experimental study of burnout in channels with twisted Fuel rods," Thermal Engineering, vol. 54, No. 5, 2007, pp. 386-389 [Cited in Parent].

(Continued)

*Primary Examiner* — Jack W Keith
*Assistant Examiner* — Daniel Wasil
(74) *Attorney, Agent, or Firm* — Squire Patton Boggs US LLP

(57) ABSTRACT

A fuel assembly for use in a core of a nuclear power reactor. The assembly includes a plurality of helically twisted fuel elements supported by a frame in a fuel rod bundle. Each of the fuel elements includes fissile material. When viewed in a cross-section that is perpendicular to an axial direction of the fuel assembly, the outermost fuel elements of the fuel rod bundle define a substantially circular perimeter. The fuel elements are arranged in a mixed grid pattern that includes a first, rectangular grid pattern and a second, triangular grid pattern.

16 Claims, 6 Drawing Sheets

Related U.S. Application Data continuation-in-part of application No. 14/081,056, filed on Nov. 15, 2013, now Pat. No. 10,170,207, which is a continuation-in-part of application No. 13/695,792, filed as application No. PCT/US2011/036034 on May 11, 2011, now Pat. No. 10,037,823.

(60) Provisional application No. 62/050,985, filed on Sep. 16, 2014, provisional application No. 61/821,918, filed on May 10, 2013, provisional application No. 61/444,990, filed on Feb. 21, 2011, provisional application No. 61/393,499, filed on Oct. 15, 2010, provisional application No. 61/333,467, filed on May 11, 2010.

(51) Int. Cl.
| | |
|---|---|
| *G21C 3/08* | (2006.01) |
| *G21C 3/28* | (2006.01) |
| *G21C 3/326* | (2006.01) |
| *G21C 3/58* | (2006.01) |
| *G21C 21/10* | (2006.01) |
| *G21C 3/32* | (2006.01) |
| *G21C 1/20* | (2006.01) |

(52) U.S. Cl.
CPC .............. *G21C 3/28* (2013.01); *G21C 3/32* (2013.01); *G21C 3/326* (2013.01); *G21C 3/58* (2013.01); *G21C 21/10* (2013.01); *Y02E 30/30* (2013.01)

(58) Field of Classification Search
USPC .................................................. 376/435, 454
See application file for complete search history.

(56) References Cited

U.S. PATENT DOCUMENTS

| | | | |
|---|---|---|---|
| 2,887,357 A | 5/1959 | Seaberg | |
| 2,894,827 A | 7/1959 | Hyde | |
| 2,898,185 A | 8/1959 | Boyd | |
| 2,977,297 A | 3/1961 | Evans | |
| 2,987,458 A | 6/1961 | Breden | |
| 3,030,291 A | 4/1962 | Butter et al. | |
| 3,034,975 A | 5/1962 | Beurtheret | |
| 3,046,088 A | 7/1962 | Horn | |
| 3,063,925 A | 11/1962 | Huet | |
| 3,070,527 A | 12/1962 | Hurford et al. | |
| 3,088,900 A | 5/1963 | Brown | |
| 3,096,264 A | 7/1963 | Bauer | |
| 3,105,035 A | 9/1963 | Weems | |
| 3,133,867 A | 5/1964 | Frisch | |
| 3,154,471 A | 10/1964 | Radkowsky | |
| 3,177,123 A | 4/1965 | Huet | |
| 3,197,376 A | 7/1965 | Balent et al. | |
| 3,197,383 A | 7/1965 | Maillet | |
| 3,208,912 A | 9/1965 | Jaye et al. | |
| 3,219,535 A | 11/1965 | Robbins | |
| 3,252,867 A | 5/1966 | Conley | |
| 3,275,564 A | 9/1966 | Pascard | |
| 3,282,335 A | 11/1966 | De Haller | |
| 3,285,825 A | 11/1966 | Jens | |
| 3,297,544 A | 1/1967 | Hooper | |
| 3,308,031 A | 3/1967 | Pon | |
| 3,308,033 A | 3/1967 | Alfille | |
| 3,309,277 A | 3/1967 | Jaye | |
| 3,322,644 A | 5/1967 | Benson | |
| 3,335,060 A | 8/1967 | Diener | |
| 3,339,631 A | 9/1967 | McGurty | |
| 3,361,640 A | 1/1968 | Hassig et al. | |
| 3,366,547 A | 1/1968 | Gumuchian | |
| 3,378,453 A | 4/1968 | Gorker | |
| 3,394,049 A | 7/1968 | Jones | |
| 3,486,973 A | 12/1969 | Georges | |
| 3,546,068 A | 12/1970 | Schluderberg | |
| 3,567,582 A | 3/1971 | Van Dievoet | |
| 3,577,225 A | 5/1971 | Shaffer | |
| 3,629,066 A * | 12/1971 | Andersson | G21C 3/338 376/454 |
| 3,637,931 A | 1/1972 | Donjon et al. | |
| 3,640,844 A | 2/1972 | Shank et al. | |
| 3,660,227 A | 5/1972 | Ackroyd et al. | |
| 3,660,228 A | 5/1972 | Magladry | |
| 3,671,392 A | 6/1972 | Beaudoin | |
| 3,687,805 A | 8/1972 | Desbois | |
| 3,714,322 A | 1/1973 | Bell et al. | |
| 3,736,227 A | 5/1973 | Nakazato | |
| 3,801,734 A | 4/1974 | West | |
| 3,814,667 A | 6/1974 | Klumb | |
| 3,847,736 A | 11/1974 | Bevilacqua | |
| 3,853,703 A | 12/1974 | Anthony et al. | |
| 3,859,165 A | 1/1975 | Radkowsky et al. | |
| 3,956,147 A | 5/1976 | Becker et al. | |
| 3,957,575 A | 5/1976 | Fauth, Jr. et al. | |
| T947,011 I4 | 6/1976 | Radkowsky | |
| 3,960,655 A | 6/1976 | Bohanan et al. | |
| 3,971,575 A | 7/1976 | Lesham et al. | |
| 3,998,692 A | 12/1976 | Bohanan et al. | |
| 4,020,131 A | 4/1977 | Feraday | |
| 4,029,740 A | 6/1977 | Ervin, Jr. | |
| 4,059,539 A | 11/1977 | Potter et al. | |
| 4,072,564 A | 2/1978 | Jabsen | |
| 4,077,835 A | 3/1978 | Bishop et al. | |
| 4,078,967 A | 3/1978 | Anthony | |
| 4,082,609 A * | 4/1978 | Schweiger | G21C 7/107 376/226 |
| 4,111,348 A | 9/1978 | Laird et al. | |
| 4,119,563 A | 10/1978 | Kadner et al. | |
| 4,192,716 A | 3/1980 | Anthony | |
| 4,193,953 A | 3/1980 | Langen et al. | |
| 4,194,948 A | 3/1980 | Ledin | |
| 4,202,793 A | 5/1980 | Bezzi et al. | |
| 4,235,669 A | 11/1980 | Burgess et al. | |
| 4,236,966 A | 12/1980 | Savin et al. | |
| 4,268,357 A | 5/1981 | Formanek et al. | |
| 4,273,613 A | 6/1981 | Radkowsky | |
| 4,278,501 A | 7/1981 | Steinke | |
| 4,285,771 A | 8/1981 | Downs | |
| 4,292,278 A | 9/1981 | Elikan et al. | |
| 4,298,434 A | 11/1981 | Anthony et al. | |
| 4,304,631 A | 12/1981 | Walton et al. | |
| 4,309,251 A | 1/1982 | Anthony et al. | |
| 4,320,093 A | 3/1982 | Volesky et al. | |
| 4,324,618 A | 4/1982 | Schluderberg | |
| 4,344,912 A | 8/1982 | Rampolla | |
| 4,381,284 A | 4/1983 | Gjertsen | |
| 4,393,510 A | 7/1983 | Lang et al. | |
| RE31,583 E | 5/1984 | Klumb et al. | |
| 4,450,016 A | 5/1984 | Vesterlund et al. | |
| 4,450,020 A | 5/1984 | Vesterlund | |
| 4,474,398 A | 10/1984 | Tolino et al. | |
| 4,495,136 A | 1/1985 | Camden, Jr. et al. | |
| 4,499,047 A | 2/1985 | Borrman et al. | |
| 4,507,259 A | 3/1985 | Cowell et al. | |
| 4,508,679 A | 4/1985 | Matzner et al. | |
| 4,540,545 A | 9/1985 | Kondo | |
| 4,544,522 A | 10/1985 | Curulla et al. | |
| 4,551,300 A | 11/1985 | Feutrel | |
| 4,560,532 A | 12/1985 | Barry et al. | |
| 4,572,816 A | 2/1986 | Gjertsen et al. | |
| 4,578,240 A | 3/1986 | Cadwell | |
| 4,579,711 A | 4/1986 | Mishima et al. | |
| 4,584,167 A | 4/1986 | Carelli | |
| 4,587,078 A | 5/1986 | Azekura et al. | |
| 4,589,929 A | 5/1986 | Steinberg | |
| 4,615,862 A | 10/1986 | Huckestein | |
| 4,645,642 A | 2/1987 | Leclercq et al. | |
| 4,652,425 A | 3/1987 | Ferrari et al. | |
| 4,659,538 A | 4/1987 | Leclercq | |
| 4,664,880 A | 5/1987 | Bryan | |
| 4,666,664 A | 5/1987 | Doshi | |
| 4,670,213 A | 6/1987 | Wilson et al. | |
| 4,671,924 A | 6/1987 | Gjertsen et al. | |

(56) References Cited

U.S. PATENT DOCUMENTS

| | | | |
|---|---|---|---|
| 4,671,927 A | 6/1987 | Alsop |
| 4,678,619 A | 7/1987 | Radkowsky |
| 4,678,627 A | 7/1987 | Rylatt |
| 4,678,632 A | 7/1987 | Ferrari |
| 4,680,443 A | 7/1987 | Vere et al. |
| 4,684,495 A | 8/1987 | Wilson et al. |
| 4,684,503 A | 8/1987 | Shallenberger |
| 4,692,304 A | 9/1987 | Gjertsen |
| 4,699,758 A | 10/1987 | Shallenberger et al. |
| 4,699,761 A | 10/1987 | Gjertsen et al. |
| 4,702,883 A | 10/1987 | Wilson et al. |
| 4,716,015 A | 12/1987 | Carlson |
| 4,746,488 A | 5/1988 | Pradal et al. |
| 4,749,519 A | 6/1988 | Koehly et al. |
| 4,749,544 A | 6/1988 | Crowther et al. |
| 4,762,676 A | 8/1988 | Gjertsen et al. |
| 4,765,909 A | 8/1988 | Rourke et al. |
| 4,818,474 A | 4/1989 | Malhouitre et al. |
| 4,820,473 A | 4/1989 | Ohashi et al. |
| 4,828,792 A | 5/1989 | Leclercq et al. |
| 4,832,905 A | 5/1989 | Bryan et al. |
| 4,842,814 A | 6/1989 | Takase et al. |
| 4,859,400 A | 8/1989 | Curzon |
| 4,879,086 A | 11/1989 | Luce et al. |
| 4,880,607 A | 11/1989 | Horton et al. |
| 4,900,507 A | 2/1990 | Shallenberger et al. |
| 4,918,710 A | 4/1990 | Bard |
| 4,938,921 A | 7/1990 | Mardon et al. |
| 4,942,016 A | 7/1990 | Marlowe et al. |
| 4,954,293 A | 9/1990 | Cailly et al. |
| 4,957,695 A | 9/1990 | Rudolph |
| 4,968,476 A | 11/1990 | Radkowsky |
| 4,986,957 A | 1/1991 | Taylor |
| 4,986,960 A | 1/1991 | Larson |
| 4,997,596 A | 3/1991 | Proebstle et al. |
| 5,002,726 A | 3/1991 | Johansson |
| 5,009,837 A | 4/1991 | Nguyen et al. |
| 5,009,839 A | 4/1991 | King |
| 5,019,327 A | 5/1991 | Fanning et al. |
| 5,019,333 A | 5/1991 | Isobe et al. |
| 5,024,426 A | 6/1991 | Busch et al. |
| 5,024,807 A | 6/1991 | Hatfield et al. |
| 5,024,809 A | 6/1991 | Taylor |
| 5,024,810 A | 6/1991 | Bachman |
| 5,026,516 A | 6/1991 | Taylor |
| 5,030,412 A | 7/1991 | Yates et al. |
| 5,032,351 A | 7/1991 | Johansson |
| 5,035,869 A | 7/1991 | Furuya |
| 5,037,605 A | 8/1991 | Riordan, III |
| 5,053,191 A | 10/1991 | Bryan et al. |
| 5,069,864 A | 12/1991 | Johansson |
| 5,073,336 A | 12/1991 | Taylor |
| 5,085,827 A | 2/1992 | Johansson et al. |
| 5,089,210 A | 2/1992 | Reese et al. |
| 5,089,220 A | 2/1992 | Nylund |
| 5,089,221 A | 2/1992 | Johansson et al. |
| 5,091,145 A | 2/1992 | Petit |
| 5,093,075 A | 3/1992 | Chevereau et al. |
| 5,094,802 A | 3/1992 | Riordan, III |
| 5,110,539 A | 5/1992 | Perrotti et al. |
| 5,112,571 A | 5/1992 | Orii et al. |
| 5,128,097 A | 7/1992 | Fukasawa et al. |
| 5,135,710 A | 8/1992 | Grattier et al. |
| 5,135,728 A | 8/1992 | Karraker |
| 5,136,619 A | 8/1992 | Capossela et al. |
| 5,141,701 A | 8/1992 | Bryan |
| 5,147,597 A | 9/1992 | Roofthooft et al. |
| 5,147,600 A | 9/1992 | Kadono et al. |
| 5,149,491 A | 9/1992 | Congdon et al. |
| 5,164,050 A | 11/1992 | Bertaud et al. |
| 5,183,629 A | 2/1993 | Canat et al. |
| 5,186,891 A | 2/1993 | Johansson et al. |
| 5,188,797 A | 2/1993 | Bryan |
| 5,192,495 A | 3/1993 | Caldwell et al. |
| 5,194,216 A | 3/1993 | McDaniels, Jr. |
| 5,200,142 A | 4/1993 | DeMario et al. |
| 5,202,085 A | 4/1993 | Aoyama et al. |
| 5,209,899 A | 5/1993 | Johansson et al. |
| 5,211,908 A | 5/1993 | Verdier |
| 5,219,519 A | 6/1993 | Matzner |
| 5,221,515 A | 6/1993 | Thiebaut et al. |
| 5,223,211 A | 6/1993 | Inagaki et al. |
| 5,241,570 A | 8/1993 | Challberg |
| 5,243,635 A | 9/1993 | Bryan |
| 5,247,550 A | 9/1993 | Perkins et al. |
| 5,259,009 A | 11/1993 | Patterson et al. |
| 5,259,010 A | 11/1993 | Brown et al. |
| 5,263,071 A | 11/1993 | Farkas et al. |
| 5,265,139 A | 11/1993 | Kanagi et al. |
| 5,267,291 A | 11/1993 | Matzner et al. |
| 5,271,053 A | 12/1993 | Bryan |
| 5,272,741 A | 12/1993 | Masuhara et al. |
| 5,272,742 A | 12/1993 | Attix et al. |
| 5,274,685 A | 12/1993 | Yates |
| 5,276,721 A | 1/1994 | Beuerlein |
| 5,278,882 A | 1/1994 | Garde et al. |
| 5,278,883 A | 1/1994 | Patterson et al. |
| 5,282,231 A | 1/1994 | Adams et al. |
| 5,283,812 A | 2/1994 | Verdier |
| 5,283,821 A | 2/1994 | Karoutas |
| 5,286,946 A | 2/1994 | Will |
| 5,289,514 A | 2/1994 | Lippert et al. |
| 5,297,176 A | 3/1994 | Altman et al. |
| 5,297,177 A | 3/1994 | Inagaki et al. |
| 5,299,246 A | 3/1994 | Bryan |
| 5,301,218 A | 4/1994 | Taylor, Jr. et al. |
| 5,307,393 A | 4/1994 | Hatfield |
| 5,328,524 A | 7/1994 | Hertz |
| 5,340,447 A | 8/1994 | Bertaud et al. |
| 5,341,407 A | 8/1994 | Rosenbaum et al. |
| 5,345,483 A | 9/1994 | Johansson et al. |
| 5,347,560 A | 9/1994 | Lippert et al. |
| 5,349,618 A | 9/1994 | Greenspan |
| 5,373,541 A | 12/1994 | Mardon et al. |
| 5,375,154 A | 12/1994 | Matzner et al. |
| 5,377,246 A | 12/1994 | Taylor, Jr. et al. |
| 5,383,228 A | 1/1995 | Armijo et al. |
| 5,384,814 A | 1/1995 | Matzner et al. |
| 5,386,439 A | 1/1995 | Leroy et al. |
| 5,386,440 A | 1/1995 | Kashiwai et al. |
| 5,390,220 A | 2/1995 | Zuloaga, Jr. et al. |
| 5,390,221 A | 2/1995 | Dix et al. |
| 5,390,222 A | 2/1995 | Rau et al. |
| 5,403,565 A | 4/1995 | Delloye et al. |
| 5,404,383 A | 4/1995 | Nylund |
| 5,417,780 A | 5/1995 | Adamson et al. |
| 5,420,901 A | 5/1995 | Johansson |
| 5,420,902 A | 5/1995 | Dressel et al. |
| 5,434,897 A | 7/1995 | Davies |
| 5,434,898 A | 7/1995 | Barkhurst |
| 5,436,946 A | 7/1995 | Curulla et al. |
| 5,436,947 A | 7/1995 | Taylor |
| 5,437,747 A | 8/1995 | Adamson et al. |
| 5,438,598 A | 8/1995 | Attix |
| 5,440,599 A | 8/1995 | Rodack et al. |
| 5,444,748 A | 8/1995 | Beuchel et al. |
| 5,452,334 A | 9/1995 | Reparaz et al. |
| 5,469,481 A | 11/1995 | Adamson et al. |
| 5,473,650 A | 12/1995 | Johansson |
| 5,481,577 A | 1/1996 | Yates et al. |
| 5,481,578 A | 1/1996 | Matzner |
| 5,483,564 A | 1/1996 | Matzner et al. |
| 5,488,634 A | 1/1996 | Johansson et al. |
| 5,488,644 A | 1/1996 | Johansson |
| 5,490,189 A | 2/1996 | Schechter |
| 5,490,190 A | 2/1996 | Hopkins et al. |
| 5,517,540 A | 5/1996 | Marlowe et al. |
| 5,517,541 A | 5/1996 | Rosenbaum et al. |
| 5,519,745 A | 5/1996 | Proebstle et al. |
| 5,519,746 A | 5/1996 | Dalke et al. |
| 5,519,748 A | 5/1996 | Adamson et al. |
| 5,524,032 A | 6/1996 | Adamson et al. |
| 5,526,387 A | 6/1996 | Johansson et al. |
| 5,528,640 A | 6/1996 | Johansson et al. |

(56) References Cited

U.S. PATENT DOCUMENTS

| | | |
|---|---|---|
| 5,530,729 A | 6/1996 | Gustafsson |
| 5,538,701 A | 7/1996 | Avens et al. |
| 5,539,791 A | 7/1996 | Garzarolli et al. |
| 5,539,792 A | 7/1996 | Buttner et al. |
| 5,539,793 A | 7/1996 | Johansson et al. |
| 5,546,437 A | 8/1996 | Matzner et al. |
| 5,572,560 A | 11/1996 | Brown |
| 5,577,081 A | 11/1996 | Yaginuma |
| 5,578,145 A | 11/1996 | Adamson et al. |
| 5,596,615 A | 1/1997 | Nakamura et al. |
| 5,600,694 A | 2/1997 | Broders |
| 5,606,724 A | 2/1997 | Wai et al. |
| 5,609,697 A | 3/1997 | Moinard et al. |
| 5,618,356 A | 4/1997 | Adamson et al. |
| 5,620,536 A | 4/1997 | Dahlback |
| 5,622,574 A | 4/1997 | Charquet |
| 5,648,995 A | 7/1997 | Mardon et al. |
| 5,666,389 A | 9/1997 | Andersson et al. |
| 5,674,330 A | 10/1997 | Charquet et al. |
| 5,675,621 A | 10/1997 | Croteau et al. |
| 5,681,404 A | 10/1997 | Adamson et al. |
| 5,699,396 A | 12/1997 | Taylor |
| 5,702,544 A | 12/1997 | Mardon et al. |
| 5,711,826 A | 1/1998 | Nordstrom |
| 5,726,418 A | 3/1998 | Duthoo |
| 5,727,039 A | 3/1998 | Harmon et al. |
| 5,732,116 A | 3/1998 | Petit |
| 5,737,375 A | 4/1998 | Radkowsky |
| 5,740,218 A | 4/1998 | Frederickson et al. |
| 5,748,694 A | 5/1998 | King |
| 5,768,332 A | 6/1998 | Van Swam |
| 5,774,514 A | 6/1998 | Rubbia |
| 5,774,517 A | 6/1998 | Palavecino et al. |
| 5,778,035 A | 7/1998 | Nylund |
| 5,787,142 A | 7/1998 | Van Swam |
| 5,805,657 A | 9/1998 | Beck |
| 5,808,271 A | 9/1998 | Duthoo |
| 5,826,163 A | 10/1998 | Saraceno et al. |
| 5,832,050 A | 11/1998 | Rebeyrolle et al. |
| 5,838,753 A | 11/1998 | Van Swam et al. |
| 5,844,957 A | 12/1998 | Johannesson et al. |
| 5,852,645 A | 12/1998 | Romary et al. |
| 5,854,818 A | 12/1998 | Van Swam et al. |
| 5,859,887 A | 1/1999 | Richards |
| 5,864,593 A | 1/1999 | Radkowsky |
| 5,878,100 A | 3/1999 | Johannesson et al. |
| 5,892,807 A | 4/1999 | Van Swam |
| 5,901,193 A | 5/1999 | Dahlback et al. |
| 5,926,517 A | 7/1999 | Van Swam |
| 5,940,464 A | 8/1999 | Mardon et al. |
| 5,949,837 A | 9/1999 | Radkowsky |
| 5,949,839 A | 9/1999 | Nylund |
| 6,002,735 A | 12/1999 | Van Swam |
| 6,010,671 A | 1/2000 | Kimura |
| 6,026,136 A | 2/2000 | Radkowsky |
| 6,033,493 A | 3/2000 | Hertz et al. |
| 6,088,420 A | 7/2000 | Yokoyama et al. |
| 6,110,437 A | 8/2000 | Schall et al. |
| 6,130,927 A | 10/2000 | Kang et al. |
| 6,167,105 A | 12/2000 | Koon et al. |
| 6,192,098 B1 | 2/2001 | Van Swam |
| 6,205,196 B1 | 3/2001 | Yamashita et al. |
| 6,226,342 B1 | 5/2001 | Micko et al. |
| 6,228,337 B1 | 5/2001 | Ioffe |
| 6,229,868 B1 | 5/2001 | Nylund et al. |
| 6,236,701 B1 | 5/2001 | Nylund |
| 6,236,702 B1 | 5/2001 | Chun et al. |
| 6,243,433 B1 | 6/2001 | Adamson et al. |
| 6,278,757 B1 | 8/2001 | Yokomizo et al. |
| 6,278,759 B1 | 8/2001 | Yoon et al. |
| 6,310,931 B1 | 10/2001 | Gustafsson et al. |
| 6,320,924 B1 | 11/2001 | Croteau |
| 6,327,324 B2 | 12/2001 | Nylund |
| 6,339,205 B1 | 1/2002 | Nakayama |
| 6,385,271 B2 | 5/2002 | Nylund |
| 6,393,087 B1 | 5/2002 | Oh et al. |
| 6,400,788 B1 | 6/2002 | Hirano et al. |
| 6,421,407 B1 | 7/2002 | Kang et al. |
| 6,429,403 B1 | 8/2002 | Nakayama |
| 6,434,209 B1 | 8/2002 | Groeneveld et al. |
| 6,473,482 B1 | 10/2002 | Steinke |
| 6,488,783 B1 | 12/2002 | King et al. |
| 6,516,043 B1 | 2/2003 | Chaki et al. |
| 6,519,309 B1 | 2/2003 | Van Swam |
| 6,522,710 B2 | 2/2003 | Smith et al. |
| 6,539,073 B1 | 3/2003 | Smith et al. |
| 6,542,566 B2 | 4/2003 | Adamson et al. |
| 6,542,567 B1 | 4/2003 | Mayet et al. |
| 6,544,361 B1 | 4/2003 | Diz et al. |
| 6,608,880 B2 | 8/2003 | Smith et al. |
| 6,608,881 B2 | 8/2003 | Oh et al. |
| 6,621,885 B2 | 9/2003 | Brichet |
| 6,665,366 B2 | 12/2003 | Aujollet et al. |
| 6,690,758 B1 | 2/2004 | Elkins |
| 6,707,872 B2 | 3/2004 | Yoon et al. |
| 6,714,619 B2 | 3/2004 | Oh et al. |
| 6,721,384 B2 | 4/2004 | Oh et al. |
| 6,728,329 B2 | 4/2004 | Hirano et al. |
| 6,744,842 B2 | 6/2004 | Schmidt et al. |
| 6,758,917 B2 | 7/2004 | King et al. |
| 6,807,246 B1 | 10/2004 | Kim et al. |
| 6,819,733 B2 | 11/2004 | Broders et al. |
| 6,845,138 B2 | 1/2005 | Chun et al. |
| 6,847,695 B2 | 1/2005 | Kageyama et al. |
| 6,863,745 B1 | 3/2005 | Charquet et al. |
| 6,884,304 B1 | 4/2005 | Charquet |
| 6,888,911 B2 | 5/2005 | Stabel-Weinheimer et al. |
| 6,888,912 B2 | 5/2005 | Morel et al. |
| 6,901,128 B2 | 5/2005 | Mori et al. |
| 6,909,766 B2 | 6/2005 | Kido et al. |
| 6,925,138 B2 | 8/2005 | Nakamaru et al. |
| 6,934,350 B1 | 8/2005 | Challberg et al. |
| 6,943,315 B2 | 9/2005 | Cho et al. |
| 6,960,326 B1 | 11/2005 | Webb et al. |
| 6,991,731 B2 | 1/2006 | Koegler |
| 7,037,390 B2 | 5/2006 | Miyahara et al. |
| 7,085,340 B2 | 8/2006 | Goldenfield et al. |
| 7,087,206 B2 | 8/2006 | Bond et al. |
| 7,127,024 B2 | 10/2006 | Garzarolli et al. |
| 7,169,370 B2 | 1/2007 | Mesmin et al. |
| 7,192,563 B2 | 3/2007 | Singh et al. |
| 7,195,745 B2 | 3/2007 | Brandel et al. |
| 7,309,473 B2 | 12/2007 | Caranoni et al. |
| 7,323,153 B2 | 1/2008 | Amamoto et al. |
| 2002/0075988 A1 | 6/2002 | Hirano et al. |
| 2002/0080908 A1 | 6/2002 | Nakamaru et al. |
| 2002/0122762 A1 | 9/2002 | Fukasawa et al. |
| 2003/0026381 A1 | 2/2003 | Ukai et al. |
| 2005/0031067 A1 | 2/2005 | Mori et al. |
| 2005/0069075 A1 | 3/2005 | D'Auvergne |
| 2005/0105677 A1 | 5/2005 | Yoon et al. |
| 2005/0157836 A1 | 7/2005 | Broach et al. |
| 2005/0226358 A1 | 10/2005 | Bonnamour et al. |
| 2005/0238131 A1 | 10/2005 | Hellandbrand et al. |
| 2006/0045231 A1 | 3/2006 | Lee et al. |
| 2006/0153327 A1 | 7/2006 | Jiang et al. |
| 2006/0171498 A1 | 8/2006 | D'Auvergne |
| 2006/0233685 A1 | 10/2006 | Janes |
| 2006/0251205 A1 | 11/2006 | Balog |
| 2006/0283790 A1 | 12/2006 | Elkins et al. |
| 2007/0036260 A1 | 2/2007 | Fetterman et al. |
| 2007/0080328 A1 | 4/2007 | Zavodchikov et al. |
| 2007/0133734 A1 | 6/2007 | Fawcett et al. |
| 2007/0165766 A1 | 7/2007 | Aleshin et al. |
| 2007/0183556 A1 | 8/2007 | Labarriere et al. |
| 2007/0201605 A1 | 8/2007 | Ishii et al. |
| 2007/0206717 A1 | 9/2007 | Conner et al. |
| 2007/0211843 A1 | 9/2007 | Smith et al. |
| 2007/0242793 A1 | 10/2007 | Song et al. |
| 2008/0013667 A1 | 1/2008 | Oh et al. |
| 2008/0130820 A1 | 6/2008 | Ukai et al. |
| 2008/0144762 A1 | 6/2008 | Holden et al. |
| 2008/0152068 A1 | 6/2008 | Aktas et al. |
| 2008/0152069 A1 | 6/2008 | Aktas et al. |

(56) References Cited

U.S. PATENT DOCUMENTS

| | | |
|---|---|---|
| 2008/0179042 A1 | 7/2008 | Evans et al. |
| 2009/0252278 A1 | 10/2009 | Bashkirtsev et al. |
| 2011/0311016 A1 | 12/2011 | Bashkirtsev et al. |
| 2013/0114777 A1 | 5/2013 | Goszczynski |
| 2013/0322591 A1 | 12/2013 | Bashkirtsev et al. |
| 2016/0035441 A1 | 2/2016 | Totemeier et al. |

FOREIGN PATENT DOCUMENTS

| | | |
|---|---|---|
| CN | 1230280 A | 9/1999 |
| CN | 1351352 A | 5/2002 |
| CN | 1945751 A | 4/2007 |
| CN | 101299351 A | 11/2008 |
| CN | 102301430 A | 12/2011 |
| CN | 102543224 A | 7/2012 |
| CN | 102947890 A | 2/2013 |
| DE | 1464481 A1 | 1/1969 |
| DE | 1514124 A1 | 9/1969 |
| EP | 0080853 A2 | 6/1983 |
| EP | 0620558 A1 | 10/1994 |
| EP | 0871958 A2 | 10/1998 |
| EP | 2 372 717 A1 | 10/2011 |
| FR | 1444002 A | 7/1966 |
| FR | 2632657 A1 | 12/1989 |
| GB | 853511 A | 11/1960 |
| GB | 876 021 A | 8/1961 |
| GB | 876399 A | 8/1961 |
| GB | 887713 A | 1/1962 |
| GB | 904 140 A | 8/1962 |
| GB | 920343 A | 3/1963 |
| GB | 1 031 678 A | 6/1966 |
| GB | 1043782 A | 9/1966 |
| GB | 1068964 A | 5/1967 |
| GB | 1 126 396 A | 9/1968 |
| GB | 1 282 767 A | 7/1972 |
| GB | 1 287 767 A | 9/1972 |
| GB | 2229172 A | 9/1990 |
| JP | 34-001962 B1 | 2/1956 |
| JP | S38-005344 B | 5/1963 |
| JP | S39-009943 | 6/1964 |
| JP | S41-002279 B | 2/1966 |
| JP | S41-021399 B | 12/1966 |
| JP | S42-012028 | 7/1967 |
| JP | S43-020223 | 8/1968 |
| JP | S 53-40187 A | 4/1978 |
| JP | 58-021194 A | 2/1983 |
| JP | 58 187891 A | 11/1983 |
| JP | 59-23830 | 2/1984 |
| JP | S 61-181993 A | 8/1986 |
| JP | S62-168091 A | 7/1987 |
| JP | 2018328 | 1/1990 |
| JP | H02 66494 A | 3/1990 |
| JP | 2221893 | 11/1990 |
| JP | H06-094869 A | 4/1994 |
| JP | H06-201872 A | 7/1994 |
| JP | 63-134520 | 6/1998 |
| JP | 11-183674 A | 7/1999 |
| JP | 11-508367 A | 7/1999 |
| JP | H11-511553 A | 10/1999 |
| JP | 11-352272 A | 12/1999 |
| JP | 3094195 B2 | 10/2000 |
| JP | 2001-500265 A | 1/2001 |
| JP | 2002-122687 A | 4/2002 |
| JP | 2003-248079 A | 9/2003 |
| JP | 2004-020463 A | 1/2004 |
| JP | 2006-284487 A | 10/2006 |
| JP | 2007-507700 A | 3/2007 |
| JP | 2007-507702 A | 3/2007 |
| JP | 2008-170454 A | 7/2008 |
| JP | 04-303796 B2 | 7/2009 |
| JP | 2009-162739 A | 7/2009 |
| JP | 2011-508877 A | 3/2011 |
| JP | 2012-514197 A | 6/2012 |
| JP | 2013-526709 A | 6/2013 |
| KR | 100654961 B1 | 12/2006 |
| KR | 10-2010-0129798 | 12/2010 |
| RU | 2170956 C1 | 7/2001 |
| RU | 2176826 C2 | 12/2001 |
| RU | 2222837 C2 | 1/2004 |
| RU | 2238089 C2 | 10/2004 |
| RU | 2246142 C1 | 2/2005 |
| RU | 2267175 C2 | 12/2005 |
| RU | 2294570 C1 | 2/2007 |
| RU | 2389089 C1 | 5/2010 |
| WO | 1985/001826 A1 | 4/1985 |
| WO | 93/16477 A1 | 8/1993 |
| WO | 97/08711 A2 | 3/1997 |
| WO | 2002/010074 A1 | 2/2002 |
| WO | 2009/082254 A1 | 7/2009 |
| WO | 2010/074592 A1 | 7/2010 |
| WO | 2011/143293 A1 | 11/2011 |

OTHER PUBLICATIONS

International Preliminary Report on Patentability issued in International Application No. PCT/US2011/035859, dated Nov. 22, 2012 [Cited in Parent].
International Preliminary Report on Patentability issued in International Application No. PCT/US2012/020878 dated Aug. 25, 2013 [Cited in Parent].
International Search Report and Written Opinion issued in International Application No. PCT/US2011/036034 dated Sep. 21, 2011 [Cited in Parent].
Chinese Office Action dated Aug. 19, 2013 in related Chinese Patent Application No. 200880132741.8 [Cited in Parent].
Japanese Office Action dated Oct. 1, 2013 in related Japanese Patent Application No. 2011-543460. [Cited in Parent].
Examination Report dated Sep. 17, 2013 in related Australian Application No. 2008365658. [Cited in Parent].
Korean Office Action dated Feb. 25, 2014 in related Korean Patent Application No. 10-2010-7026035. [Cited n Parent].
Korean Office Action dated Feb. 25, 2014 in related Korean Patent Application No. 10-2010-7016627. [Cited n Parent].
Canadian Office Action dated Mar. 12, 2014 in related Canadian Patent Application No. 2,710,432. [Cited in Parent].
Examination Report dated Feb. 14, 2014 in related Australian Patent Application No. 2011250906. [Cited in Parent].
Buongiorno et al., Core Design Options for High Power Density BWRs (MIT-NFC-PR-089), Nuclear Fuel Cycle (NFC) Technology and Policy Program, Dec. 2006. [Cited in Parent].
Buongiorno et al., Core Design Options for High Power Density BWRs (MIT-NFC-PR-097), Nuclear Fuel Cycle (NFC) Technology and Policy Program, Nov. 2007. [Cited in Parent].
Buongiorno et al., Core Design Options for High Power Density BWRs (MIT-NFC-PR-102), Nuclear Fuel Cycle (NFC) Technology and Policy Program, Sep. 2008 [Cited in Parent].
Carpenter et al., High Performance Fuel Design for Next Generation PWRs: Final Report (MIT-NFC-PR-082), Nuclear Fuel Cycle (NFC) Technology and Policy Program, Jan. 2006. [Cited in Parent].
Diakov, C., "Feasibility of converting Russian icebreaker reactors from HEU to LEU fuel," Science and Global Security, vol. 14, pp. 33-48, Routledge Taylor & Francia Group, 2006 [Cited in Parent].
European Search Report issued in European Patent Application No. 08172834 dated Aug. 19, 2009 [Cited in Parent].
European Search Report issued in European Patent Application No. 10166457 dated Aug. 11, 2010 [Cited in Parent].
Halber et al., "Energy Futures," MIT Energy Initiative, 2009, ISSN 1942-4671, Massachusetts Institute of Technology, pp. 5-7 [Cited in Parent].
International Preliminary Report on Patentability issued in International Application No. PCT/RU2008/000801 dated Jul. 5, 2011 [Cited in Parent].
International Search Report issued in International Application No. PCT/RU2007/000732 dated Jul. 10, 2008 [Cited in Parent].
International Search Report issued in International Application No. PCT/RU2007/000801 dated Sep. 3, 2009 [Cited in Parent].
Supplementary European Search Report issued in European Patent Application No. 08879222.1 dated Apr. 16, 2013 [Cited in Parent].

(56) References Cited

OTHER PUBLICATIONS

Office Action issued in U.S. Appl. No. 13/139,677 dated Mar. 10, 2014. [Cited in Parent].
International Search Report and Written Opinion dated Sep. 15, 2014 in International Patent Application No. PCT/US2014/036437. [Cited in Parent].
Notice of Reasons for Rejection dated Oct. 7, 2014 in related Japanese Patent Application No. 2011-543460. [Cited in Parent].
Reasons for Rejection dated Dec. 24, 2014 in Korean Patent Application No. 10-2011-7016736. [Cited in Parent].
Notice of Reasons for Rejection dated Feb. 3, 2015 in Japanese Patent Application No. 2013-510271. [Cited in Parent].
Translation of Examination Report dated Jan. 20, 2015 in Ukranian Patent Application No. a201213992. [Cited in Parent].
Decision for Grant and Partial English Translation dated Apr. 28, 2015 in Japanese Patent Application No. 2011-543460 [Cited in Parent].
Notice of Reasons for Rejection and Organized Translation dated Nov. 4, 2015 in Japanese Patent Application No. 2013-510271. [Cited in Parent].
International Search Report dated Feb. 10, 2016 in International Patent Application No. PCT/US2015/050454. [Cited in Parent].
Written Opinion dated Feb. 10, 2016 in International Patent Application No. PCT/US2015/050454. [Cited in Parent].
Notice of Allowance dated Feb. 22, 2016 in Chinese Patent Application No. 201180023785.9. [Cited in Parent].
Decision of Grant (and partial English translation) dated Mar. 15, 2016 in Japanese Patent Application No. 2014-114955. [Cited in Parent].
Notice of Reasons for Rejection (and English translation) dated Mar. 15, 2016 in Japanese Patent Application No. 2015-094071. [Cited in Parent].
Extended European Search Report dated May 4, 2016 in European Patent Application No. 16153633.9. [Cited in Parent].
Office Action dated Jun. 9, 2016 in U.S. Appl. No. 14/081,056. [Cited in Parent].
Japanese Decision for Grant dated Aug. 2, 2016 in Japanese Patent Application No. 2013-510271. [Cited in Parent].
Japanese Decision for Grant dated Aug. 2, 2016 in Japanese Patent Application No. 2015-094071. [Cited in Parent].
Office Action dated Oct. 18, 2016 in U.S. Appl. No. 14/081,056. [Cited in Parent].
Chinese Office Action and English Translation dated Nov. 28, 2016 in Chinese Patent Application No. 201480036401.0. [Cited in Parent].
Akabori, "Interdiffusion in the U-Zr system at d-phase compositions," Journal of Alloys and Compounds 271-273 (1998), pp. 597-601 [Cited in Parent].
Kouhsen, "Preparation and Thermochemical Stability of Uranium-Zirconium-Carbonitrides," Journal of Nuclear Materials 61 (1976), pp. 88-98. [Cited in Parent].
Simnad, "The U-ZrHx Alloy: Its Properties and use in TRGIA Fuel," Nuclear Engineering and Design 64 (1981), pp. 403-422. [Cited in Parent].
Office Action dated Mar. 10, 2017 in U.S. Appl. No. 13/695,792. [Cited in Parent].
Office Action dated Mar. 20, 2017 in U.S. Appl. No. 14/081,056. [Cited in Parent].

Notification of Reasons for Refusal dated Jun. 5, 2017 in Japanese Patent Application No. 2016-171063. [Cited in Parent].
First Office Action dated Jun. 2, 2017 in Chinese Patent Application No. 2016102180563. [Cited in Parent].
Patent Search Report dated May 24, 2017 in Chinese Patent Application No. 2016102180563. [Cited in Parent].
Office Action dated Jul. 24, 2017 in U.S. Appl. No. 14/081,056. [Cited in Parent].
Tayal et al., "A 61-Element Fuel Design (HAC) For Very High Burnups," Conference on CANDU Fuel, Oct. 1995, (1995), pp. 5A-20-5A-30. [Cited in Parent].
Conboy et al., "Experimental Investigation of Hydraulics and Lateral Mixing for Helical-Cruciform Fuel Rod Assemblies," Nuclear Technology, vol. 182, Jun. 2013, (2013) [Cited in Parent].
Notification of Reasons for Refusal issued in counterpart Japanese Patent Application No. 2016-512961 dated Oct. 16, 2017 [Cited in Parent].
Conboy, "Thermal-Hydraulic Analysis of Cross-Shaped Spiral Fuel in High Power Density BWRs," Doctoral Dissertation, MIT, 2007 [Cited in Parent].
Office Action dated Mar. 29, 2018 in U.S. Appl. No. 14/081,056 [Cited in Parent].
Decision to Grant Patent issued in counterpart Japanese Patent Application No. 2016-512961 dated Jun. 5, 2018 [Cited in Parent].
Notice of Submission in related Korean Patent Application No. 10-2012-7029003, dated Sep. 4, 2018. [Cited in Parent].
Feng, "Innovative Fuel Designs for High Power Density Pressurized Water Reactor", MIT, 2005 [Cited in Parent].
Koo, et al., "Behavior of unirradiated Zr based uranium metal fuel under reactivity initiated accident conditions", Nuclear Engineering and Design, 238, pp. 1592-1600, 2008. [Cited in Parent].
Lee et al., "Thermal stability of co-extruded U—Zr/Zr—Nb alloys", Journal of Nuclear Materials, 373, pp. 275-279, 2008. [Cited in Parent].
McDeavitt et al., "Thoria-Based Cermet Nuclear Fuel: Cermet Fabrication and Behavior Estimates", 10th International Conference on Nuclear Engineering, 2002 [Cited in Parent].
Van Duyn, "Evaluation of the Mechanical Behavior of a Metal-Matrix Dispersion Fuel for Plutonium Burning", Georgia Institute of Technology, 2003. [Cited in Parent].
Notice of Submission of Opinion issued in counterpart Korean Application No. 10-2017-7024393 dated Sep. 28, 2018 [Cited in Parent].
Reasons of Request for Revocation in counterpart Korean Patent Application No. 10-2012-7029003, received Sep. 12, 2018 [Cited in Parent].
Office Action dated Oct. 18, 2017 in U.S. Appl. No. 14/856,084. [Provided in IFW].
Office Action dated Mar. 8, 2018 in U.S. Appl. No. 14/856,084 [Provided in IFW].
Trial Decision on the Reason for Revocation in counterpart Korean Patent Application No. 10-2012-7029003, dated Jan. 22, 2019.
Extended European Search Report dated Jun. 18, 2019 in European Patent Application No. 19156631.4.
Examination Report No. 1 dated Jun. 26, 2019 in Australian Patent Application No. 2018203144.
Notice of Reasons for Refusal dated Jul. 16, 2019 in Japanese Patent Application No. 2017-512054.
Decision to Refuse a Patent dated Jul. 31, 2019 in Korean Patent Application No. 10-2017-7024393.

\* cited by examiner

FUEL ASSEMBLY

CROSS-REFERENCE

This application is a continuation of U.S. application Ser. No. 14/856,084, filed Sep. 16, 2015, which is a non-provisional of U.S. Application No. 62/050,985, filed on Sep. 16, 2014. U.S. application Ser. No. 14/856,084 is also a continuation-in-part of U.S. application Ser. No. 14/081,056, filed on Nov. 15, 2013, now U.S. Pat. No. 10,170,207, which claims priority to U.S. Provisional Application No. 61/821,918, filed on May 10, 2013. U.S. application Ser. No. 14/856,084 is also a continuation-in-part of U.S. application Ser. No. 13/695,792, filed on Jun. 3, 2013, now U.S. Pat. No. 10,037,823, which is the U.S. National Stage of PCT/US2011/036034, filed on May 11, 2011, which in turn claims priority to U.S. Application No. 61/444,990, filed Feb. 21, 2011, U.S. Application No. 61/393,499, filed Oct. 15, 2010, and U.S. Application No. 61/333,467, filed May 11, 2010. The entire content of all of the foregoing applications is expressly incorporated herein by reference.

BACKGROUND

Technical Field

The present invention relates generally to nuclear reactors and nuclear fuel assemblies used in the core of nuclear reactors. More specifically, the present invention relates to Canadian Deuterium-Uranium (CANDU) heavy-water reactors, and fuel assemblies for use in the same.

Related Art

FIGS. 1A and 1B depict simplified cross-sectional views of examples of conventional fuel assemblies 10. FIG. 1A depicts a fuel assembly 10 of the PWR type, and FIG. 1B depicts a fuel assembly 10 of the water-cooled water-moderated power rector (VVER) type. In FIG. 1A, the fuel rod assembly 10 comprises fuel rods assembled into a square grid. The PWR fuel assembly 10 of FIG. 1A has fuel rod bundle self-spacing that can be described as having a square cross-sectional shape. In FIG. 1B, the fuel assembly 10 comprises fuel rods arranged into a triangular grid. The VVER fuel assembly 10 of FIG. 1B has fuel rod bundle self-spacing that can be described as having a regular hexagonal cross-section shape.

When these assemblies are fitted into a tube 12, empty segments not used by the fuel rod assembly are formed, as shown by the shaded area 14 located between the tube 12 and the square 14 in FIG. 1A, and between the tube 12 and the hexagon 16 in FIG. 1B. According to embodiments, an assembly in a square grid occupies approximately 63.7% of the area of the circumscribed circle (e.g., tube 12), while an assembly in a triangular grid occupies approximately 82.7% of the area of the circumscribed circle (e.g., tube 12).

It is known to use the empty space to address concerns of fuel rod and assembly swelling during burnup. It is also known to fill these areas with a burnable absorber, etc.

SUMMARY

According to an embodiment, a fuel assembly for use in a core of a nuclear power reactor can include a frame shaped and configured fit within the nuclear reactor internal core structure; and a plurality of helically twisted fuel elements supported by the frame in a fuel rod bundle, with each of the fuel elements comprises fissile material. As viewed in a cross-section that is perpendicular to an axial direction of the fuel assembly, the outermost fuel elements of the fuel rod bundle can define a substantially circular perimeter (e.g., dodecagon). According to embodiments, the frame can be shaped and configured to fit within a pressure tube of a CANDU reactor.

According to embodiments, each of the plurality of fuel elements can have substantially the same circumscribed diameter. The plurality of fuel elements can be arranged in concentric circles. Additionally or alternatively, the plurality of fuel elements can be arranged into a mixed grid pattern that includes a first, rectangular grid pattern and a second, triangular grid pattern.

According to embodiments, the first, rectangular grid pattern and the second, triangular grid pattern can at least partially alternate with one another. Some of the plurality of fuel elements can be separated from adjacent fuel elements by a common centerline-to-centerline distance, and a circumscribed diameter of some of the plurality of fuel elements can equal the centerline-to-centerline distance.

According to embodiments, each of the fuel elements can have a multi-lobed profile that includes ribs, for example, spiral ribs. The ribs of adjacent fuel elements can periodically contact one another over the axial length of the fuel elements to at least partially maintain the spacing of the fuel elements relative to each other. According to embodiments, the fuel elements can comprise extruded fuel elements.

According to embodiments, the plurality of fuel elements can consist of 61 fuel elements.

According to embodiments, the frame can include a structure circumscribing the fuel rod bundle, such that all of the fuel elements are located inside the structure. The structure can comprise a shroud. When viewed in a cross-section that is perpendicular to an axial direction of the fuel assembly, the shroud can define a cross-section substantially defining a circle or dodecagon. When viewed in a cross-section that is perpendicular to an axial direction of the fuel assembly, the fuel assembly can occupy greater than about 64%, more specifically greater than about 83% of the internal cross-sectional area of a tube circumscribing the fuel assembly. According to an embodiment, the fuel assembly can occupy between about 83% and about 95% of the internal cross-sectional area of the tube circumscribing the fuel assembly.

According to embodiments, the fuel assembly is thermodynamically designed and physically shaped for operation in a conventional land-based nuclear power reactor of a conventional nuclear power plant having a reactor design that was in actual use before 2014, and the frame is shaped and configured to fit into the land-based nuclear power reactor in place of a conventional fuel assembly for said reactor. For example, the conventional land-based nuclear power reactor can be a CANDU reactor.

According to another aspect of the present invention, a nuclear reactor includes a core and one or more fuel assemblies disposed within the core. The fuel assembly can include: a frame shaped and configured to fit within the core; and a plurality of helically twisted fuel elements supported by the frame in a fuel rod bundle, with each of the fuel elements comprising fissile material. As viewed in a cross-section that is perpendicular to an axial direction of the fuel assembly, the outermost fuel elements of the fuel rod bundle can define a substantially circular perimeter. According to embodiments, the nuclear reactor is a CANDU reactor comprising pressure tubes, and the frame is shaped and configured to fit within the pressure tubes.

According to embodiments, each of the plurality of fuel elements can have substantially the same circumscribed diameter. The plurality of fuel elements can be arranged in concentric circles, and/or the plurality of fuel elements can be arranged into a mixed grid pattern that includes a first, rectangular grid pattern and a second, triangular grid pattern. The first, rectangular grid pattern and the second, triangular grid pattern can at least partially alternate with one another.

According to embodiments, the nuclear reactor was in actual use before 2014.

According to embodiments, each of the fuel elements has a multi-lobed profile that includes spiral ribs. The ribs of adjacent fuel elements can periodically contact one another over the axial length of the fuel elements to at least partially maintain the spacing of the fuel elements relative to each other. According to embodiments, the fuel elements can comprise extruded fuel elements.

According to embodiments, the frame of the fuel element comprises a structure circumscribing the fuel rod bundle, such that all of the fuel elements are located inside the structure. The structure can comprise a shroud that when viewed in a cross-section that is perpendicular to an axial direction of the fuel assembly, defines a cross-section substantially defining a circle or dodecagon.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a," "an," and "the" include plural referents unless the context clearly dictates otherwise.

BRIEF DESCRIPTION OF THE DRAWINGS

For a better understanding of embodiments of the present invention, as well as other features thereof, reference is made to the following description which is to be used in conjunction with the following drawings, wherein.

DETAILED DESCRIPTION

Embodiments described herein can increase the fuel burnup power and/or level (operating time until unloading) of a CANDU fuel assembly and/or reactor as a whole, while maintaining or increasing the level of safety. According to embodiments, this can be achieved through the use of fuel assemblies made from twisted, self-spaced, monolithic fuel rods, for example, the extruded uranium-zirconium (U—Zr) fuel rods disclosed in applicant's co-pending U.S. application Ser. Nos. 14/081,056 and 13/695,792, the entire contents of which are expressly incorporated herein by reference.

CANDU fuel assemblies typically utilize very short (e.g., on the order of 50 cm) fuel rods. Embodiments of the present invention provide partially or fully self-spaced assemblies of CANDU fuel rods. For example, some fuel assemblies disclosed herein provide for self-spacing of all the fuel rods among themselves (e.g., rib by rib). However, alternative embodiments can include non-self-spaced arrangements. Embodiments can include a frame having a shroud, or other channel or device surrounding all or a part of the fuel rod bundle (referred to generally herein as a "shroud"), and better utilize the space available inside the shroud than is possible with the prior art. For example, as will be described in more detail below, embodiments use a "square-triangular" fuel rod grid in an array.

Figure 1B:
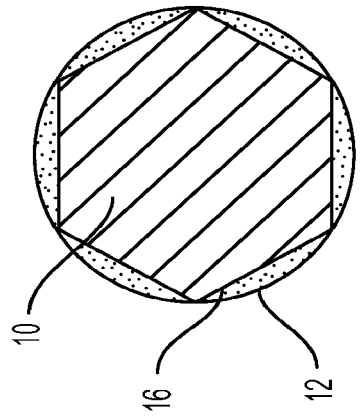
FIG. 1B is a simplified cross-sectional view of a conventional fuel assembly having fuel rods assembled in a triangular grid.
Figure 1A:
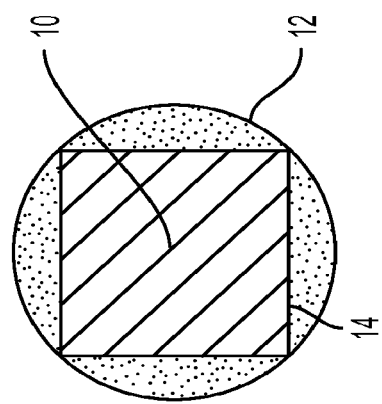
FIG. 1A is a simplified cross-sectional view of a conventional fuel assembly having fuel rods assembled in a square grid.
Figure 2:
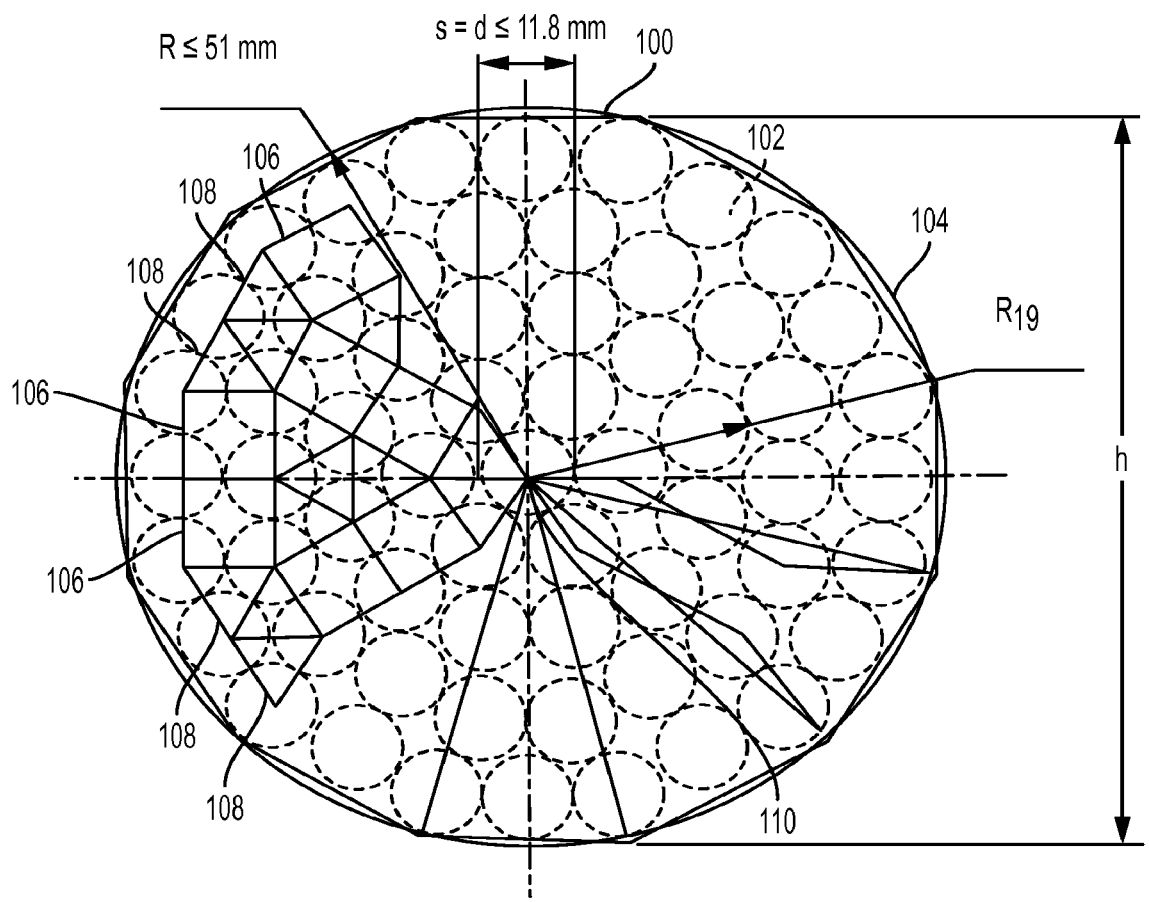
FIG. 2 is a simplified cross-sectional view of a layout of a self-spaced fuel assembly made up of 61 fuel rods in a square-triangular grid, according to an embodiment.

FIG. 2 is a simplified cross-sectional view of an embodiment of a self-spaced fuel assembly 100. The fuel assembly can include 61 fuel rods 102 in a square-triangular grid, however, other configurations may be possible. The fuel assembly shown in FIG. 2 can have the same or similar envelope as an Advanced CANDU Reactor (ACR) CANDU Flexible (CANFLEX) 43-element assembly. Whereas a typical CANFLEX assembly has 43 fuel elements each with an outer diameter of about 13.5 mm, the fuel assembly 100 shown in FIG. 2 can have 61 fuel elements 102 each with an outer diameter of about 11.5 mm, however, other quantities and sizes of fuel elements are contemplated.

Figure 3:
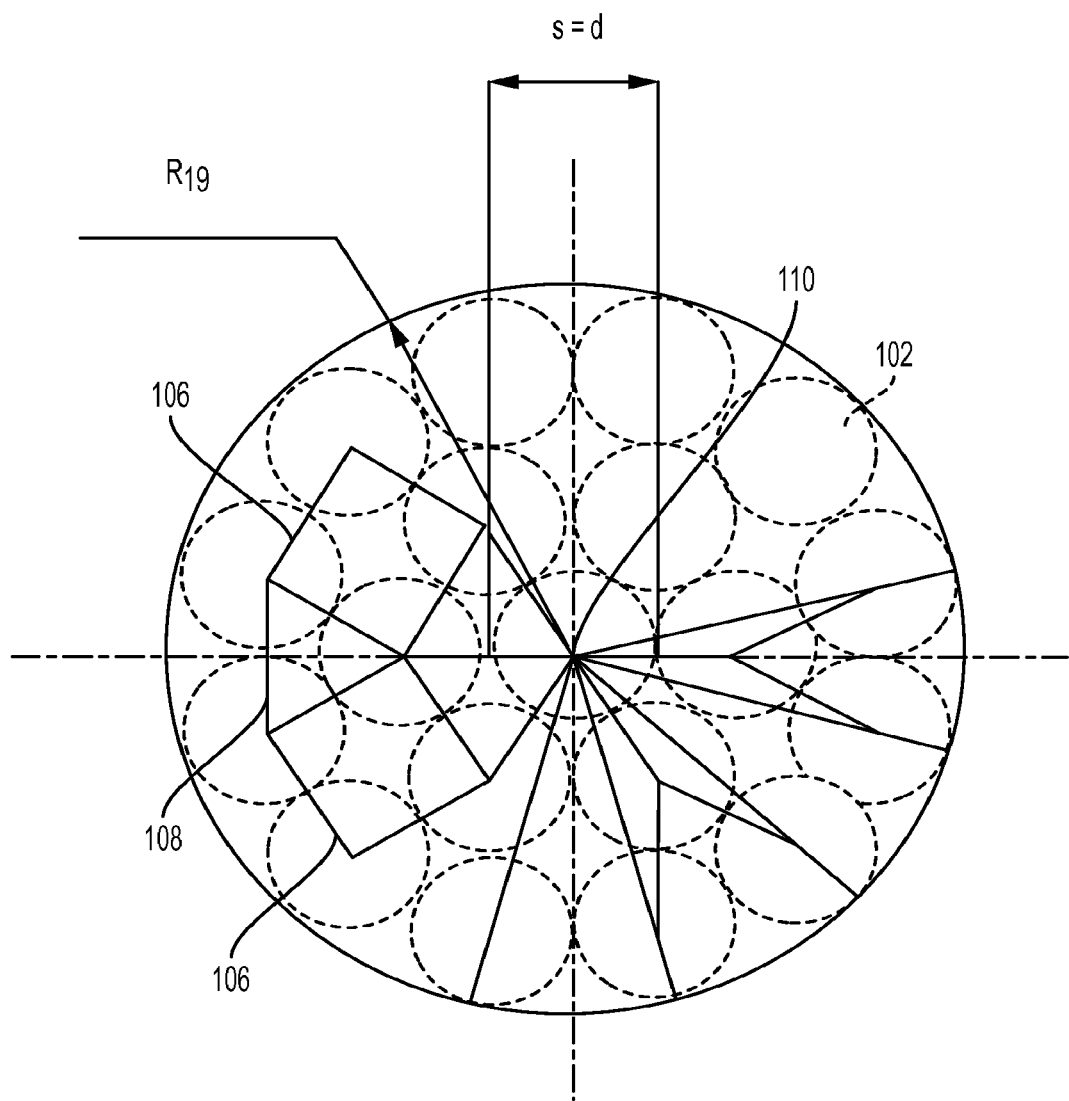
FIG. 3 is a simplified cross-sectional view of a layout of a self-spaced fuel assembly made up of 19 fuel rods in a square-triangular grid, according to an embodiment.

The fuel assembly of FIG. 2 can be fitted into a shroud 104. For example, the shroud 104 can have a cross-section in the shape of a dodecagon, however, other shapes are envisioned. According to embodiments, the radius R of a circle circumscribing the fuel elements 102 can be less than or equal to 51 mm. According to embodiments, the inner radius of the shroud 104 can be about 51.7 mm, however, other embodiments are possible. Shroud 104 can have a dodecagon shape, and can define a width h across the flats of about 100 mm (≤99.99 mm). According to embodiments, the square-triangular grid of 61 fuel elements defines an outer perimeter that occupies approximately 95.5% of the area of the circumscribed circle (e.g., the shroud 104 or pressure tube). With reference to FIG. 3, the central area of 19 fuel rods 102 can fit nearly perfectly into a tube. According to embodiments, the radius R19 of a circle circumscribing the central 19 fuel rods can have a diameter of 3.922 mm, however, other dimensions are possible.

Referring to FIGS. 2 and 3, the fuel elements can be located in first and second grid patterns intermixed with one another to form what is referred to herein as a "square-triangular grid." The first grid pattern includes squarely arranged rows and columns of fuel elements having a centerline-to-centerline distance between the rows and columns that equals the common circumscribed diameter "d" of the fuel elements (see reference 106 in FIG. 3 for an example of the first "square" grid). The second grid pattern includes equilateral triangles in which a length of each side of each triangle (i.e., the centerline-to-centerline distance between adjacent fuel elements defining the corners of each triangle) is the common circumscribed diameter "d" of the fuel elements (see reference 108 in FIG. 3 for an example of a second "triangular" grid). Thus, the second/triangular grid pattern 108 is different from the first/square grid pattern 106. According to alternative embodiments, additional and/or alternative grid patterns could also be used (e.g., rectangular grid patterns, isometric grid patterns, parallelogram patterns, other regular repeating patterns) without deviating from the scope of the present invention. According to embodiments, a given fuel element 102 may be located in a square grid pattern with one set of surrounding fuel elements, and simultaneously be located in a triangular grid pattern with another set of surrounding fuel elements, however, other configurations are possible.

Still referring to FIGS. 2 and 3, the square 106 and triangular 108 grid patterns can alternate with one another when viewed from one or more perspectives. For example, the square 106 and triangular 108 grid patterns can alternate with one another (but not necessarily on a one-to-one basis) with movement along any given radius from the center 110 of the fuel assembly to the outer perimeter, e.g., shroud 104. Additionally or alternatively, the fuel elements 102 can be arranged in concentric circles, and the square and triangular grid patterns can alternate with one another (but not necessarily on a one-to-one basis) with movement around any one of the concentric circles.

As mentioned before, the fuel elements may be self-spacing. According to embodiments, the self-spacing can be a factor of the fuel rod circumscribed diameter, independent of the fuel rod shape selected, however, other configurations are possible. According to certain embodiments, the fuel rods 102 may be any shape with twisted ribs (e.g., a tube with ribs, squares, etc.). However, other shapes may be possible, such as circular cross-sections, regular geometric cross-sections, etc.

Figure 4:
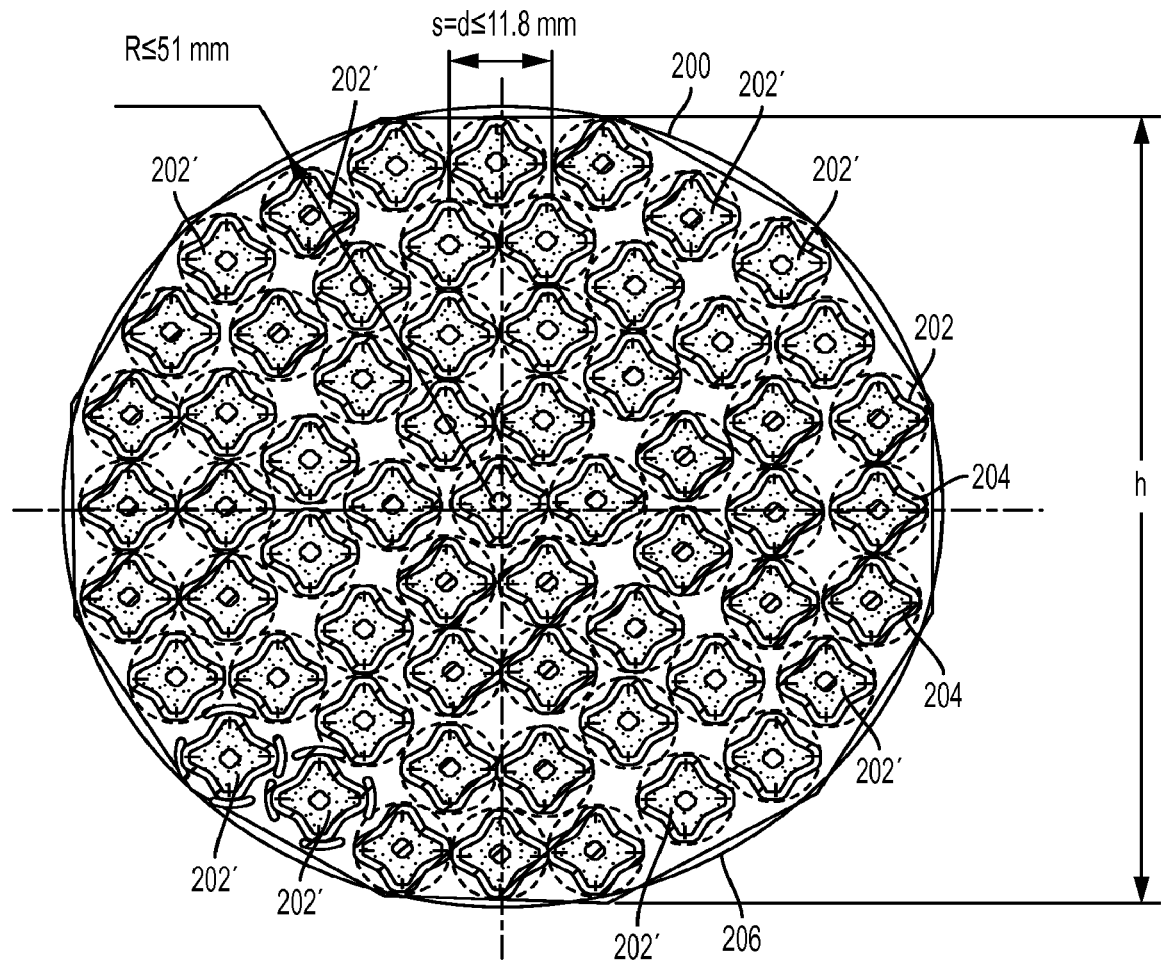
FIG. 4 depicts a cross-sectional view of an embodiment of a fuel assembly at an initial reference position along the fuel assembly, referred to herein as the initial 0° position.
Figure 5:
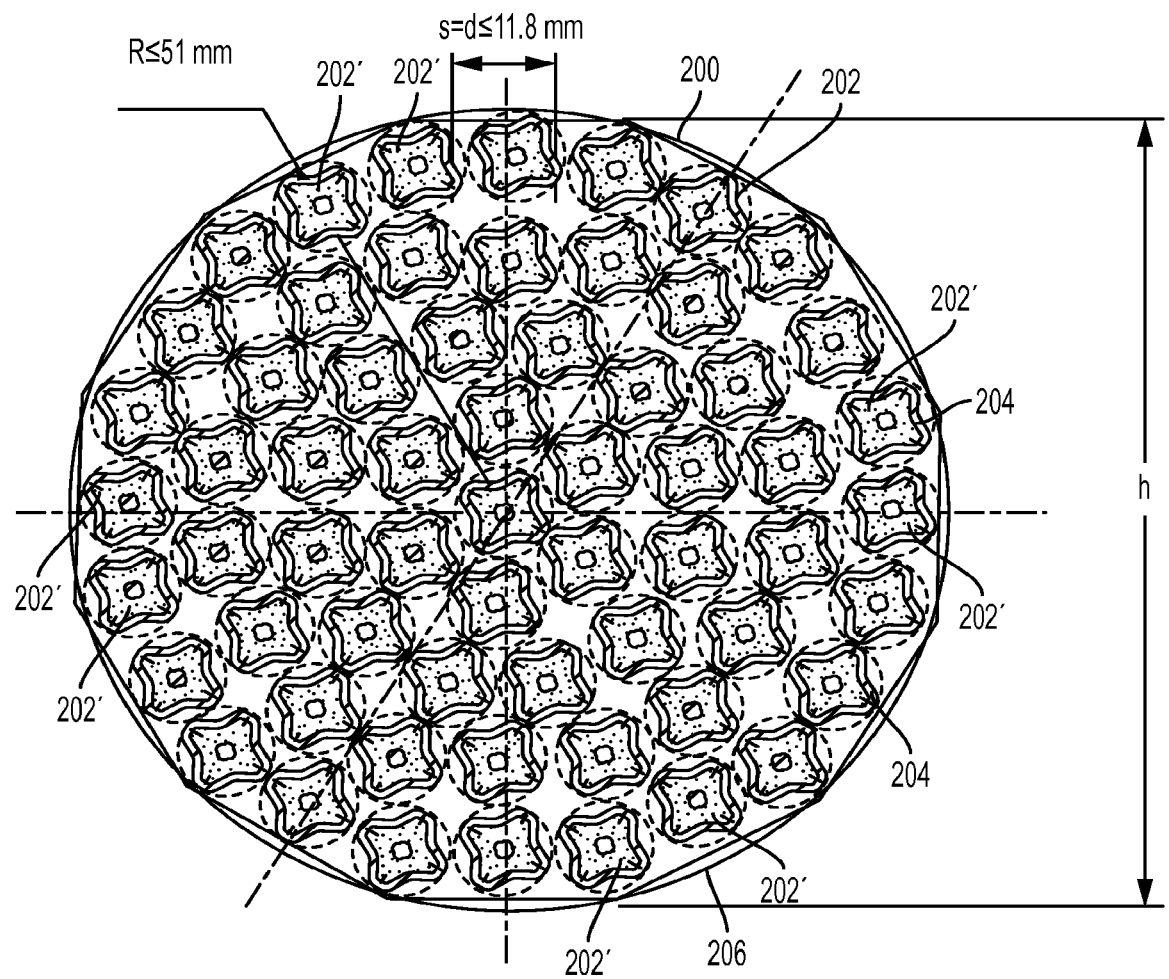
FIG. 5 depicts a cross-sectional view of the fuel assembly of FIG. 4 at a 30° fuel rod rotation, or at a lengthwise displacement of $\frac{1}{12}$ of the fuel rod swirl pitch, with respect to the initial 0° position of FIG. 4.
Figure 6:
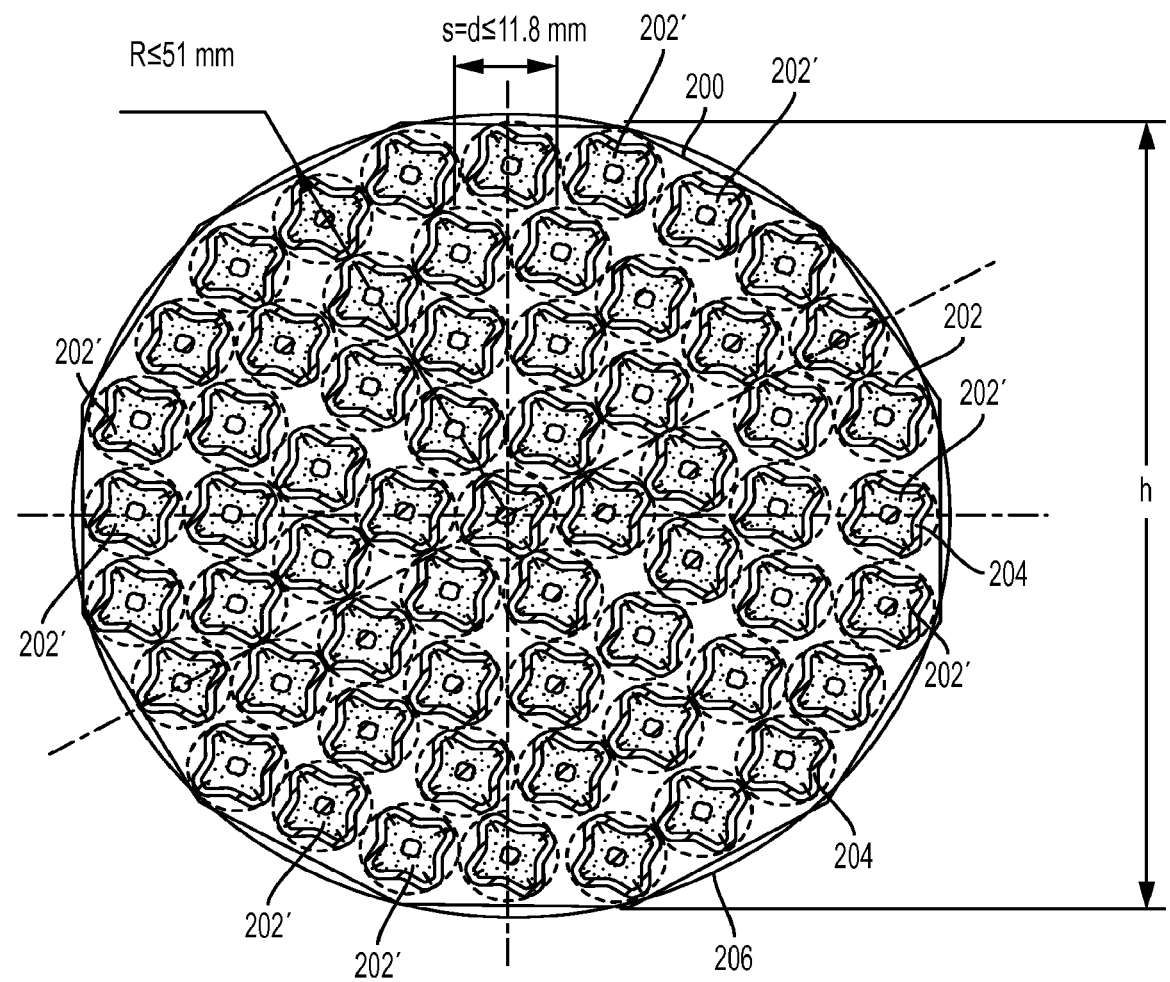
FIG. 6 depicts a cross-sectional view of the fuel assembly of FIG. 4 at a 60° fuel rod rotation, or at a lengthwise displacement of $\frac{1}{6}$ of the fuel rod swirl pitch, with respect to the initial 0° position of FIG. 4.

FIGS. 4-6 depict cross-sectional views of an embodiment of a fuel assembly 200 comprising four-lobe fuel rods 202, such as those described in applicant's co-pending U.S. application Ser. Nos. 14/081,056 and 13/695,792, the entire contents of which are incorporated herein by reference. According to a further aspect, certain fuel rod shapes such as the four-lobe design, may be standardized for different reactors. For example, a fuel rod with a four-lobe shape, a circumscribed diameter of 12±1 mm, and slight modifications may become standard for different reactors such as the PWR and CANDU.

FIG. 4 depicts the fuel assembly 200 at an initial reference position, referred to herein as the initial 0° position. The initial 0° position can occur at any point along the fuel rods 202, and can occur at regular intervals. FIG. 5 depicts the fuel assembly 200 of FIG. 4 at the point of 30° rotation of the fuel rod's lobes 204 (e.g., lengthwise displacement of 1/12 of the fuel rod swirl pitch) with respect to FIG. 4. FIG. 6 depicts the fuel assembly of FIG. 4 at the point of 60° rotation of the fuel rods' lobes 204 (e.g., lengthwise displacement of 1/6 of the fuel rod swirl pitch) with respect to FIG. 4. A 90° rotation of the lobes 204, or a lengthwise displacement of 1/4 of the fuel rod swirl pitch, away from the position of FIG. 4 replicates the tentative initial position of 0° shown in FIG. 4. In FIGS. 4-6, the eight fuel rods 202' indicate the only rods within the cross-section that do not have contact with other fuel rods 202 or the shroud 206. At axial locations between those shown in FIGS. 4, 5, and 6, there is no lengthwise contact of the fuel rods with one another or with the shroud 206. Accordingly, the fuel assembly is self-spacing and all the fuel rods are self-spaced along the length of the assembly.

As mentioned previously, the fuel rods can comprise the four-lobe fuel rods described in applicant's co-pending U.S. application Ser. Nos. 14/081,056 and 13/695,792. However, according to alternative embodiments, any of the four-lobe fuel rods in the afore-described fuel assemblies can replaced by standard pelleted cylindrical fuel rods (uranium or thorium), or burnable poison bearing fuel rods (e.g., containing gadolinium (Gd), erbium (Er), and/or dysprosium (Dy)).

As used throughout this application, the term "shroud" encompasses a variety of different designs that can surround the fuel rod bundle, either partially or completely. For example, according to embodiments, a "shroud" can be a solid dodecagonal shroud, perforated or with slits. Alternatively, the "shroud" can comprise individual bands or a shrouding strip, or riveting on cylindrical shell (e.g., solid or "openwork" with slits). Moreover, the term "shroud" can encompass other similar structures and designs apparent to one of ordinary skill in the art based on this description.

The foregoing illustrated embodiments are provided to illustrate the structural and functional principals of the present invention and are not intended to be limiting. To the contrary, the principles of the present invention are intended to encompass any and all changes, alterations, and/or substitutions within the spirit and scope of the following claims.

What is claimed is:

1. A fuel assembly for use in an internal core structure of a nuclear power reactor, the fuel assembly comprising:
   a plurality of fuel elements, each fuel element of the plurality of fuel elements having a longitudinal centerline,
   wherein the plurality of fuel elements are arranged into a predetermined mixed grid pattern that includes a first grid pattern and a second grid pattern different from the first grid pattern, the first grid pattern and the second pattern each being defined by the longitudinal centerlines of the plurality of fuel elements, wherein the first grid pattern does not encompass the pattern of the second grid pattern and the second grid pattern does not encompass the pattern of the first grid pattern,
   wherein the longitudinal centerlines of a subset of the plurality of fuel elements are separated from the longitudinal centerlines of adjacent fuel elements by a common centerline-to-centerline distance, and a circumscribed diameter of each of the fuel elements of the subset is equal to the centerline-to-centerline distance, the circumscribed diameter being equal to the largest cross-sectional dimension of the fuel element taken along a length of the entire respective fuel element, the length of the fuel element extending parallel to the longitudinal centerline.

2. The fuel assembly of claim 1, wherein the longitudinal centerline of each of the plurality of fuel elements of the first grid pattern is separated from the longitudinal centerline of adjacent fuel elements by the common centerline-to-centerline distance, and a circumscribed diameter of each of the fuel elements of the first grid pattern is equal to the centerline-to-centerline distance.

3. The fuel assembly of claim 2, wherein the longitudinal centerline of each of the plurality of fuel elements of the second grid pattern is separated from the longitudinal centerline of adjacent fuel elements by the common centerline-to-centerline distance, and a circumscribed diameter of each of the fuel elements of the second grid pattern is equal to the centerline-to-centerline distance.

4. The fuel assembly of claim 1, wherein a fuel element located in the first grid pattern with a first set of fuel elements is simultaneously located in the second grid pattern with a second set of fuel elements.

5. The fuel assembly of claim 1, wherein the first grid pattern and the second grid pattern alternate with one another.

6. The fuel assembly of claim 1, wherein the plurality of fuel elements are arranged in concentric circles and wherein the first grid pattern and the second grid pattern alternate with another along one or more of the concentric circles.

7. The fuel assembly of claim 6, wherein the first grid pattern and the second grid pattern alternate along one or more of the concentric circles in a three-to-one basis.

8. The fuel assembly of claim 1, wherein the first grid pattern is one of a rectangular grid pattern, an isometric grid pattern, a parallelogram grid pattern, a triangular grid pattern, and an equilateral triangular grid pattern.

9. The fuel assembly of claim 1, wherein the first grid pattern is a rectangular grid pattern and the second grid pattern is a triangular grid pattern.

10. The fuel assembly of claim 1, wherein the plurality of fuel elements are four-lobe fuel rods, pelleted cylindrical fuel rods, or burnable poison bearing fuel rods.

11. The fuel assembly of claim 1, wherein the plurality of fuel elements are helically twisted fuel elements having a multi-lobed profile that includes spiral ribs.

12. The fuel assembly of claim 1, wherein the plurality of fuel elements further comprise a perimeter circumscribing the plurality of fuel elements.

13. The fuel assembly of claim 12, wherein the perimeter is a shroud.

14. The fuel assembly of claim 12, wherein the plurality of fuel elements consists of 61 fuel elements and wherein the perimeter is a shroud circumscribing the 61 fuel elements, the shroud having a cross-sectional shape of a circle or dodecagon.

15. The fuel assembly of claim 12, wherein the plurality of fuel elements consists of 19 fuel elements and wherein the perimeter has a shape of a circle circumscribing the 19 fuel elements.

16. The fuel assembly of claim 1, wherein the plurality of fuel elements occupy at least 83% of a cross-sectional area of a circle that circumscribes the fuel assembly.

* * * * *